US009792628B2

(12) United States Patent
Gil et al.

(10) Patent No.: US 9,792,628 B2
(45) Date of Patent: Oct. 17, 2017

(54) DISPATCH SYSTEM TO REMOTE DEVICES

(71) Applicant: Google Inc., Mountain View, CA (US)

(72) Inventors: Elad Gil, San Francisco, CA (US); Shumeet Baluja, Leesburg, VA (US); Maryam Garrett, Boston, MA (US); Cedric Beust, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 27 days.

(21) Appl. No.: 14/826,769

(22) Filed: Aug. 14, 2015

(65) Prior Publication Data

US 2015/0356620 A1 Dec. 10, 2015

Related U.S. Application Data

(63) Continuation of application No. 11/186,291, filed on Jul. 21, 2005, now Pat. No. 9,118,774.

(51) Int. Cl.
| | |
|---|---|
| *G06Q 30/00* | (2012.01) |
| *G06Q 30/02* | (2012.01) |
| *G06F 17/30* | (2006.01) |
| *H04M 1/725* | (2006.01) |
| *H04M 1/2745* | (2006.01) |

(52) U.S. Cl.
CPC ... *G06Q 30/0267* (2013.01); *G06F 17/30905* (2013.01); *G06Q 30/02* (2013.01); *H04M 1/27455* (2013.01); *H04M 1/72561* (2013.01); *H04M 1/274516* (2013.01)

(58) Field of Classification Search
USPC ......... 705/14.64, 14.66, 14.54, 14.58, 14.55, 705/14.67
See application file for complete search history.

(56) References Cited

U.S. PATENT DOCUMENTS

| | | | |
|---|---|---|---|
| 5,001,697 | A | 3/1991 | Torres |
| 5,195,092 | A | 3/1993 | Wilson |
| 5,227,771 | A | 7/1993 | Kerr |
| 5,513,342 | A | 4/1996 | Leong |

(Continued)

FOREIGN PATENT DOCUMENTS

| | | |
|---|---|---|
| EP | 1230611 A2 | 8/2002 |
| EP | 822535 B1 | 2/2006 |

(Continued)

OTHER PUBLICATIONS

First Office Action for JP Application No. 2014-143946, mailed Aug. 17, 2015, 8 pgs. [including translation].

(Continued)

*Primary Examiner* — Luis A Brown
(74) *Attorney, Agent, or Firm* — Daniel Rose; Foley & Lardner LLP

(57) ABSTRACT

A method and system for presenting promotional content to a user of a communication device involves receiving information from a communication device, where the information relates to the communication device, and identifying a result relating to the information that is capable of being presented in a plurality of formats on the communication device, and dynamically selecting a format for the result from among the plurality of formats, and presenting the result in the selected format for display by the communication device.

18 Claims, 7 Drawing Sheets

(56) References Cited

U.S. PATENT DOCUMENTS

| | | | |
|---|---|---|---|
| 5,717,923 A * | 2/1998 | Dedrick | G06F 17/30702 |
| 5,724,521 A | 3/1998 | Dedrick | |
| 5,740,549 A | 4/1998 | Reilly | |
| 5,796,401 A | 8/1998 | Winer | |
| 5,848,396 A | 12/1998 | Gerace | |
| 5,848,397 A | 12/1998 | Marsh | |
| 5,948,061 A | 9/1999 | Merriman | |
| 6,009,410 A | 12/1999 | LeMole | |
| 6,023,714 A | 2/2000 | Hill | |
| 6,026,368 A | 2/2000 | Brown | |
| 6,044,376 A | 3/2000 | Kurtzman | |
| 6,078,914 A | 6/2000 | Redfern | |
| 6,144,944 A | 11/2000 | Kurtzman | |
| 6,167,382 A | 12/2000 | Sparks | |
| 6,259,405 B1 | 7/2001 | Stewart | |
| 6,269,361 B1 | 7/2001 | Davis | |
| 6,300,947 B1 | 10/2001 | Kanevsky | |
| 6,332,127 B1 | 12/2001 | Bandera | |
| 6,401,075 B1 | 6/2002 | Mason | |
| 6,414,698 B1 | 7/2002 | Lovell | |
| 6,647,257 B2 | 11/2003 | Owensby | |
| 6,731,612 B1 | 5/2004 | Koss | |
| 6,782,137 B1 | 8/2004 | Avinash | |
| 6,792,422 B1 * | 9/2004 | Stride | G06Q 40/00 705/35 |
| 6,829,646 B1 | 12/2004 | Philyaw | |
| 6,970,602 B1 | 11/2005 | Smith | |
| 6,985,882 B1 | 1/2006 | Del Sesto | |
| 6,993,570 B1 | 1/2006 | Irani | |
| 7,039,599 B2 | 5/2006 | Merriman | |
| 7,120,235 B2 | 10/2006 | Altberg | |
| 7,136,875 B2 | 11/2006 | Anderson | |
| 7,225,142 B1 | 5/2007 | Apte | |
| 8,321,534 B1 | 11/2012 | Roskind | |
| 2001/0025275 A1 | 9/2001 | Tanaka | |
| 2002/0013725 A1 | 1/2002 | Takakura | |
| 2002/0042738 A1 * | 4/2002 | Srinivasan | G06Q 30/02 705/14.43 |
| 2002/0077130 A1 | 6/2002 | Owensby | |
| 2002/0091571 A1 | 7/2002 | Thomas | |
| 2002/0133404 A1 | 9/2002 | Pedersen | |
| 2002/0164977 A1 | 11/2002 | Link | |
| 2003/0032409 A1 | 2/2003 | Hutcheson | |
| 2003/0106022 A1 * | 6/2003 | Goodacre | G06F 17/30905 715/226 |
| 2004/0023666 A1 | 2/2004 | Moon | |
| 2004/0043770 A1 | 3/2004 | Amit | |
| 2004/0076279 A1 | 4/2004 | Taschereau | |
| 2004/0083133 A1 | 4/2004 | Nicholas | |
| 2004/0120323 A1 | 6/2004 | Viikari | |
| 2004/0137886 A1 | 7/2004 | Ross et al. | |
| 2004/0173332 A1 | 9/2004 | Steiner | |
| 2005/0021404 A1 | 1/2005 | Schoder | |
| 2005/0086345 A1 | 4/2005 | Philyaw | |
| 2005/0235048 A1 * | 10/2005 | Costa-Requena | H04L 29/06027 709/219 |
| 2005/0245241 A1 | 11/2005 | Durand | |
| 2006/0004627 A1 | 1/2006 | Baluja | |
| 2006/0074769 A1 | 4/2006 | Looney | |
| 2006/0149624 A1 | 7/2006 | Baluja | |
| 2006/0168304 A1 * | 7/2006 | Bauer | H04L 67/104 709/232 |
| 2006/0271438 A1 * | 11/2006 | Shotland | G06Q 30/02 705/14.46 |
| 2010/0036717 A1 * | 2/2010 | Trest | G06Q 30/0207 705/14.1 |

FOREIGN PATENT DOCUMENTS

| | | |
|---|---|---|
| JP | 11272574 A | 10/1999 |
| JP | 2001188730 A | 7/2001 |
| JP | 2002-015113 | 1/2002 |
| JP | 2002-236846 | 8/2002 |
| JP | 2002342213 A | 11/2002 |
| JP | 2003-186899 | 7/2003 |
| JP | 2003186796 A | 7/2003 |
| JP | 2003-271644 | 9/2003 |
| JP | 2004021443 A | 1/2004 |
| JP | 2005-037757 | 2/2005 |
| JP | 2003050767 A | 9/2008 |
| KR | 2005048224 A | 5/2005 |
| WO | WO0180075 A1 | 10/2001 |
| WO | WO-2005/043344 | 5/2005 |
| WO | WO2006128104 A3 | 11/2007 |

OTHER PUBLICATIONS

US Notice of Allowance on U.S. Appl. No. 11/186,291 DTD Apr. 21, 2015, 11 pgs.

Rosseau et al., "User adaptable multimedia presentations for the World Wide Web," Computer Networks, pp. 1273-1290, 1999.

Konno, Silicon Alley Entrepreneurs from New York—New Arsenal Area for Advertising Media, Narrowing Down Users to Distribute Information to Mobile Phones/PDAs—, Nikkei netBRAIN, Nikkei Business Publications, Inc., Apr. 8, 2001, 2( 4):78-79 (no English version available).

Ota, Advertising Services for Mobile Phones—New Promotional Tools by Moving Your Thumb, Click Rate 24%, Advances in Applications with Surprising Effects, Nikkei Net Business, Nikkei Business Publications, Inc., Feb. 10, 2001, 68:80-83 (no English version available).

Keys, Internet Advertising by This Means and That—Great Increases in Interactivity and Click Through Rate Using Multimedia, Nikkei Internet Technology, Nikkei Business Publications, Inc., Dec. 22, 1998, 18:118-127 (no English version available).

Authorized officer Lambros Pezoulas, Examiner's Report in Canada Application No. 2,616,290 mailed Sep. 3, 2013, 3 pages.

Office Action; Australia; Application No. 2006272778; Dec. 18, 2009; 2 pages.

Office Action; Australia; Application No. 2006272778; Dec. 21, 2010; 2 pages.

Office Action; Australia; Application No. 2006272778; Sep. 19, 2011; 2 pages.

Office Action; Australia; Application No. 2011224059; Jun. 4, 2012, 2 pages.

Official Inquiry; Japan; Application No. 2008-522998; Mar. 12, 2013; 6 pages.

Office Action; Japan; Application No. 2008-522998; Jun. 12, 2012; 4 pages.

Office Action; Korea; Application No. 2008-7004074; Sep. 27, 2012.

European Search Report dated Mar. 22, 2011, 7 pages.

Chinese Office Action in CN App. No. 20068003472.1, 15 Pages.

Japanese Office Action for Application No. 2008-522998, mailed Aug. 23, 2011, 4 pages.

Office Action for Application No. 2006272778, dated May 27, 2011, 2 pages.

International Search Report and Written Opinion for PCT/US2006/028402, mailed Jun. 3, 2008, 9 pages.

International Preliminary Report on Patentability for PCT/US2006/028402, issued Jul. 1, 2008, 4 pages.

Japanese Office Action for Application No. 2008-522998, dated Jan. 14, 2014, 18 pages (with English translation).

Second Office Action for JP Application No. 2014-143946, mailed May 9, 2016.

* cited by examiner

DISPATCH SYSTEM TO REMOTE DEVICES

CROSS-REFERENCE TO RELATED APPLICATIONS

This application is a continuation application of, and claims priority to, U.S. patent application Ser. No. 11/186,291, titled "Dispatch System to Remote Devices," filed on Jul. 21, 2005. The disclosure of the foregoing application is incorporated herein by reference in its entirety for all purposes.

TECHNICAL FIELD

This disclosure relates to the presentation of electronic information on communication devices, and more particularly to the presentation of electronic advertisements visually or aurally on communication devices.

BACKGROUND

Advertising is a primary technique by which sellers of products and/or services communicate with potential purchasers in the hopes of influencing them to purchase the goods and/or services they are selling, or to disperse information, convey a message, or promote a cause. Advertisers frequently desire to highlight advantages, benefits, efficiencies and promotions associated with their products and/or services, and generally wish to present the information in a fashion that will be pleasing to a viewer or listener. Effective advertising can enhance product/service desirability in the minds of consumers, which can result in increased sales, revenues, and profits for the providers. However, advertising can be expensive, and companies frequently devote substantial resources toward cost-benefit analysis efforts in an attempt to maximize their returns on advertising investment.

There are several aspects to effective advertising. To be successful, an advertising campaign should reach those potential consumers for whom the products/services are intended, such that they may be influenced to purchase the respective products/services. Additionally, the advertisement should be in a format that is useful to the person perceiving the advertisement under the prevailing circumstances. Furthermore, the advertisement should be enjoyable to the observer, as an observer is unlikely to be positively influenced by an advertisement that is distasteful or otherwise unpleasant, or by an advertisement that is presented in a format to which the observer is not receptive.

Advertisements typically are static in nature. That is, they are often presented in a particular format that remains constant, without any variability in form, function, or presentation. Examples include print advertisements in newspapers, magazines, promotional flyers, billboards, and the like. Auditory advertisements such as a recorded message broadcast over the radio or over a public address system are further examples. Television commercials provide yet another common example. Because of their static nature, such advertisements may, over time, become less effective as potential purchasers may instinctively "tune-out" the message after repeatedly being presented with the same advertisement or information in the same format. Moreover, while static advertisements may be useful to some potential customers under certain circumstances, they may not be useful to other potential customers under alternative circumstances, or may be less useful than they would be were they presented in a more appropriate format.

Interactive advertising has recently gained popularity. With interactive advertising, an advertiser attempts to target a particular group of recipients with a particular advertisement, where the particular group is believed to be receptive to the particular advertisement. In this way, advertisers may be able to contain advertising expenses by pursuing only those potential customers who fit a particular profile, or who have taken some action that is in some way related to the particular advertisement or to the associated good and/or service.

Advertising on the Internet can be interactive. For example, the Google AdWords system uses a query-keyword-relevant advertising method to present computer users (e.g., desktop computer or laptop computer users) with advertisements relevant to a tendered search request. Similarly, the Google AdSense system uses a content-relevant advertising method to serve ads relevant to the content of a document, such as a web page, to computer users. With the current popularity and ubiquity of cellular or mobile telephones, which now frequently have the capability to connect to the Internet to access online content, another interactive advertising channel has emerged. Static advertisements have been presented on mobile telephones, including fully textual advertisements and advertisements that include a coupon code. These advertisements, however, are routinely presented in the same format.

Thus, there is a need for a system that can provide effective and useful advertisements to users of mobile devices under a variety of circumstances. Moreover, there is a need for a system that can strategically analyze, select, and present advertisements in varying formats on mobile devices.

SUMMARY

A method and system are disclosed to provide dynamic service of advertisements to communication devices. In one general implementation, a method of presenting promotional content to a user of a communication device is disclosed. The method includes receiving from a communication device information relating to the communication device and identifying a result relating to the information relating to the communication device, where the result is capable of being presented in a plurality of formats on the communication device. The method further includes dynamically selecting a format for the result from among the plurality of formats, and presenting the result in the selected format for display by the communication device.

In various implementations, the information relating to the communication device may be a query, and the communication device may be a mobile communication device. The result may include a character string, and selecting the format may comprise classifying the character string and choosing the format based on the classification of the character string. The information relating to the communication device may be classified, including by parsing the information relating to the communication device, and the format may be selected by implementing a mapping from the information relating to the communication device classification to the format. The mapping may be modified in response to the receipt of a user input such that the classification of the information relating to the communication device maps to an alternative format from among the plurality of formats. The format may be selected based on a limitation of the communication device, or may be selected at random from among the plurality of formats. The format may be selected from the group consisting of a click-to-call format, a click-through-to-landing-page format, a coupon format, a video clip format, an audio clip format, and a banner format.

In some implementations, a response to content presentation may be received from a user, and the format may be selected based on the response. The response may comprise a selection of an advertisement. Additionally, a plurality of responses to content presentation may be received from the user, and the format may be selected based on the plurality of responses. In other implementations, responses may be received from a plurality of communication devices, and the format may be selected based on the plurality of responses. Each such response may include a selection of an advertisement. In still other implementations, each result in the plurality of results may be associated with a monetary value, and the format may be selected by determining a recompense based on the monetary value and a content selection history. The result may comprise an advertisement.

In another general implementation, a system for presenting promotional content to a user of a communication device is disclosed. The system includes an interface to receive information from a communication device where the information relates to the communication device, and means in communication with the interface for generating a result for the information in response to reception of the information. The result may be capable of being presented in a plurality of formats on the communication device. The system further includes means for dynamically selecting a format for the result from among the plurality of formats.

In various implementations, the result may comprise a character string, and selecting the format may comprise classifying the character string and choosing the format based on the classification of the character string. In some implementations, the format may be selected based on responses received from a plurality of communication devices, on a random selection from among the plurality of formats, or based on a limitation of the communication device. Each result in the plurality of results may be associated with a monetary value, and selecting the format may comprise determining a recompense based on the monetary value and a content selection history. A response to content presentation may be received from a user, and the format may be selected based on the response.

In yet another general implementation, a computer-readable medium with instructions stored thereon that, when executed, performs a method of presenting promotional content to a user of a communication device is disclosed. The method includes receiving from a communication device information relating to the communication device and generating a result for the information in response to reception of the information. The result may be capable of being presented in a plurality of formats on the communication device. The method further includes dynamically selecting a format for the result from among the plurality of formats, and presenting the result in the selected format on the communication device.

Various implementations may provide certain advantages. For example, a user of a communication device may be served promotional content in a format that is well-suited to the user's circumstances, or to which the user is likely to be receptive. Users may enjoy receiving promotional content in a preferred or relevant format, which may enhance the user's experience, and may increase the likelihood that the user will follow-up on the promotional content. Similarly, advertisers and goods or services providers may effectively reach potential customers with their advertising campaigns, which may lead to increased sales, revenues and profits.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The systems and techniques described here relate to strategic service of advertisements (ads) to mobile devices, which may include dynamic analysis, selection, service and presentation of advertisements. The systems can take many forms, including wireless mobile telephones, personal digital assistants (PDAs), personal communicators, and the like. Data may be entered into the devices in a variety of forms, including by telephone keypad, stylus, or audio (e.g., voice) input. In general, the systems operate by receiving a user input or selection from a mobile device, identifying one or more appropriate advertisements in response to the input, and selecting and serving to the mobile device a suitable advertising format from among two or more available formats for the advertisement(s). Presentation of information or content may be based on a user's request or requests, on other information such as recent activity by other users of the systems, or on a combination of requests and other information.

Advantageously, the systems and techniques may allow a mobile device user to be presented with promotional information in a format that is well-suited to the user's circumstances, or to which the user is likely to be receptive. This may, in turn, allow advertisers to more effectively reach potential customers with their advertising campaigns, which may lead to increased sales, revenues and profits for the advertisers and goods/services providers. Moreover, mobile device users may appreciate the convenience of advertisement presentation in a preferred format, or may enjoy the variety and spontaneity that may be attendant dynamic presentation. In this manner, the mobile device user's experience may be enhanced as relevant, useful, and visually appealing result information may be presented, while advertisers and goods/services providers may improve their business results and reduce advertising resource waste.

Figure 1:
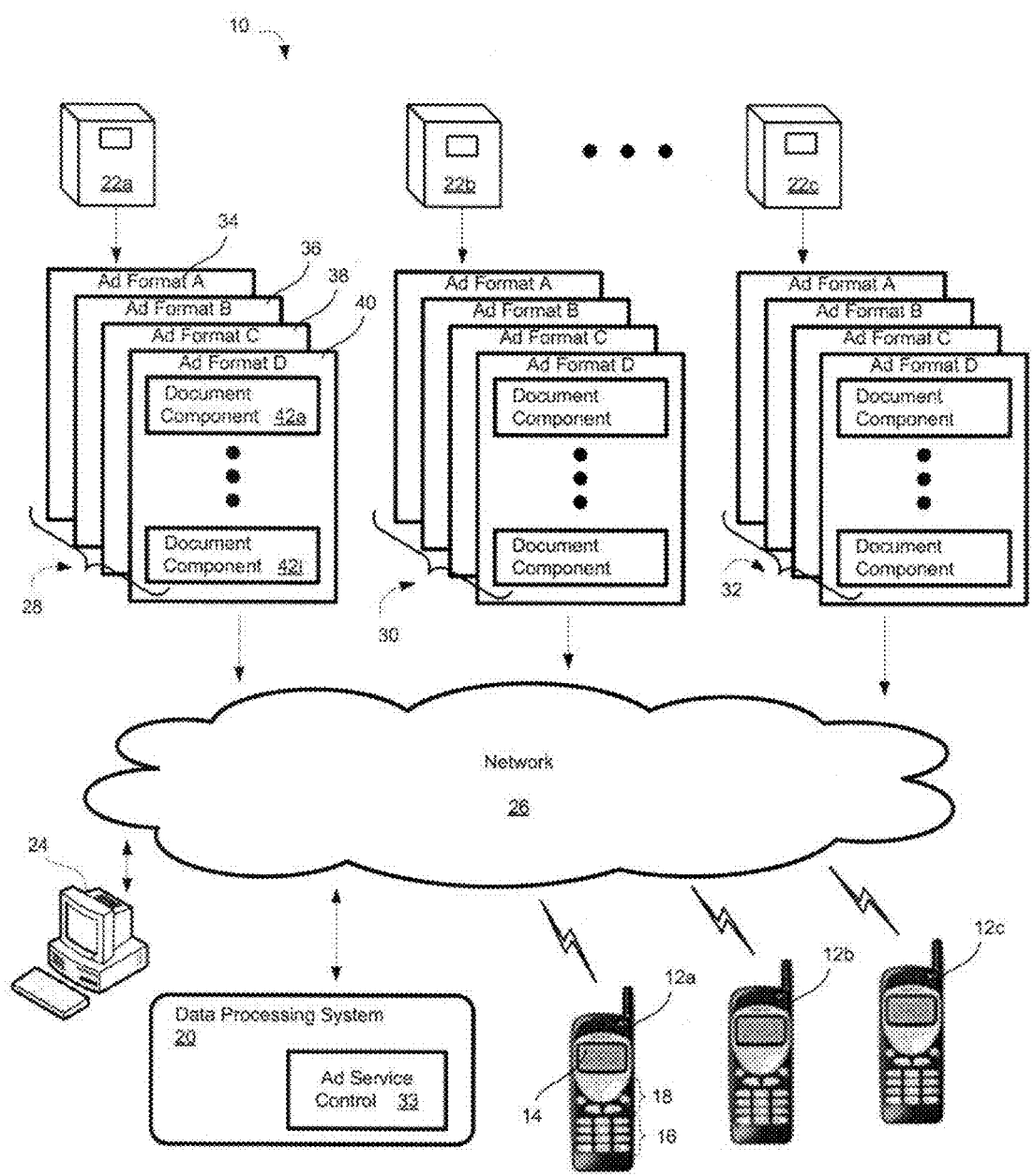
FIG. 1 is a block diagram of a system that includes a data processing system that may be used to provide dynamic service of advertisements for a mobile device, according to one implementation.

FIG. 1 is a block diagram of a system 10 that includes a data processing system that may be used to provide dynamic service of advertisements for a mobile device, according to one implementation. In this implementation, the system 10 includes one or more devices 12a-12c, shown as a cellular telephone for communicating with a user, but could take any appropriate form, such as a PDA, a personal computer, a personal communication device, etc. In this implementation, the device 12a has a display screen 14 that can be controlled to display any appropriate information to a user of the device 12a. For example, the display screen 14 could display information related to an Internet searching application, such as a search box and related control buttons, a listing of search results, or a collection of one or more advertisements, to list just a few illustrative examples. A search engine, such as a search engine connected to the cellular network by the Internet, may be used to perform a network search in response to a user stimulus originating from the mobile device 12a. The display screen 14 may then display results, as will be described in more detail below.

Data may be entered into the device 12a in any of a number of manners. Specifically, data entry keys 16 may be used to enter information such as alphanumeric characters, and may take the form of a standard telephone keypad, with alphabetic characters on the 2 through 9 keys. The keys 16 may alternatively be arranged in a non-standard pattern, and other appropriate ways of entering alphanumeric information, including voice recognition, may also be used. As used here, references to entry of text encompass entry through a keyboard or by writing, and also other manners of data entry, such as by speaking to a voice-recognition enabled system. Control keys 18 may be provided, for example, to perform predetermined functions or programmed functions, or to control icons, images, or text on the display screen 14. The keys 16, 18 may also be used as supplemental keys; i.e., the number "0" could represent something other than "0," the "#" key may be used as a space key, the "*" key may be a proxy for the backspace key, and the "1" key may represent punctuation. Any of the keys 16, 18 may also be used as directional keys for on-screen navigation. Other appropriate data presentation and data entry features may also be provided, particularly where the device 12 operates via voice control.

The system 10 also includes a data processing system 20, servers 22a-22c, a control station 24, and a network 26. The mobile devices 12, the data processing system 20, the servers 22a-22c, and the control station 24 are each coupled to the network 26. In this implementation, the mobile device 12 communicates wirelessly with the network 26, such as over a cellular telephone network. The network 26 may be a single network such as a local area network (LAN) or a wide area network (WAN) like the Internet, or may alternatively be a combination of networks. The servers 22a-22c may include content servers that store collections of documents (e.g., web pages), advertisement servers that store advertisements for various products or services (for example, text-only ads, image ads, graphical ads, audio or video ads, etc.), or e-mail servers that provide email functionality to user devices 12. Servers 22 that store combinations of documents, advertisements, emails, etc., may also be used. The documents or ads may further include embedded information such as machine-executable code or links to other documents. The servers 22 may store electronic content in electronic documents written in XHTML (Extensible Hypertext Markup Language), HTML (Hypertext Markup Language), WML (Wireless Markup Language), cHTML (compact HTML), or in any other appropriate format.

In the embodiment shown in system 10, the servers 22a-22c store electronic promotional content, such as advertisements 28, 30, 32 that may be presented on mobile devices 12a-12c, and which may be presented in a variety of formats. Each of the servers 22a, 22b, 22c is shown storing an advertisement: server 22a stores an ad 28, which may be an ad for camping equipment; similarly, server 22b stores an ad 30, which may be an ad for groceries; and server 22c stores an ad 32, which may be an ad for computer equipment, for example. Each server 22a, 22b, 22c would typically store a large number of advertisements or other electronic content; for clarity, a single advertisement is shown for each server 22a-22c in FIG. 1. In this example, each of the advertisements 28, 30, 32 may be presented on the mobile device 12 in two or more formats.

Data processing system 20 includes an advertisement service control module 33. The ad service control module 33 may dynamically analyze, select, serve and present an appropriate advertisement, or an appropriate advertisement format for an advertisement having multiple ad format possibilities, on the display 14 of the mobile device 12a-12c. The ad service control module 33 may receive a user input and present an appropriate ad format in response, including selecting an appropriate format from among a group of possible ad formats for presentation on the device 12. The ad service control module 33 may further cause an action associated with a particular ad format to be initiated, such as in response to a user input, for example.

The ad service control module 33 may function as a "learning system," reacting to past events and modifying future behavior in response, and may provide dynamic service of advertisements to mobile device users. In this manner, a mobile device user's experience may be improved as the user is presented with an ad format suitable to her prevailing circumstances. The operation of the ad service control module 33 will be described in more detail below.

Advertisement 28 has four associated formats 34, 36, 38, 40, as do the other ads 30, 32. Each ad 28, 30, 32 could have more or fewer format possibilities. For example, an ad may have one, two, three, five, six, etc., possible formats, and each format may be presentable on the mobile devices 12a-12c. For a given ad, each associated format may include similar or different content or information, may have a similar or different appearance when presented on the devices 12a-12c, or may have similar or different actions associated with it.

Some ad formats may have actions associated with them, while others may not. If an ad format has an action associated with it, a user may cause the data processing system 20 to initiate the action by making an appropriate selection or by providing an input, such as by pressing a keypad button 16, 18 on the device 12, giving a voice command if the device is voice-activation enabled, contacting a touch-sensitive screen, etc. In some cases, a given ad format may have more than one action associated with it, and the user may initiate the one or more actions, for example, by providing one or more alternative inputs.

A first format 34, labeled "Ad Format A," may be a "click-through" or "click-through-to-landing-page" format, and may permit a user to access related content, such as a web page, by making an appropriate selection (for example, by "clicking-on" a displayed icon by pressing a button 16, 18) or upon another appropriate action. In one implementation, the landing page or web site may be a home page for a business, and may present additional information concerning the business or the products/services available, etc.

In one illustrative example, the ad service control module 33 may first dynamically select advertisement 28 as being suitable for presentation to a particular mobile device user or a particular mobile device 12. Next, the ad service control module 33 may select the click-through-to-landing-page format 34 (or another appropriate format) from among the various ad format possibilities 34, 36, 38, 40 for the ad 28, and may present the advertisement 28 in the selected format 34 on the mobile device. The user may then view the ad on the device 12 and may desire to access the related content associated with the ad format 34 (such as to obtain additional information), and may make an appropriate selection. After receiving the selection, the ad service control module 33 (or alternatively, another module or component within the data processing system 20) may then present the landing page or a portion of the landing page on the display 14 of the mobile device 12 for the user's viewing pleasure. Appropriate selections may include user inputs such as a button press, touch-sensitive screen contact, voice command, or some other suitable user action, and may also include a passive selection, such as an expiration of a time-out or waiting period, for example.

A second format 36, labeled "Ad Format B," may be a "click-to-call" format, and may permit a user to directly communicate with a relevant party, such as an advertiser or goods/services provider, via a telephone call using the mobile device 12, for example. The user need not have knowledge of, or have memorized the corresponding telephone number, and the number need not have been previously stored in memory on the device 12. As such, the user may conveniently be presented with a relevant and timely communication option, without the inconvenience of having to conduct additional research such as searching for or looking up the phone number, or writing the number down.

In one implementation, following the ad service control module's 33 dynamic selection and presentation of the ad 28 in the click-to-call format 36 on the device 12, a user may make an appropriate selection, as by selecting an icon or text on the display screen 14, to place the phone call. In other implementations, a user may press an appropriate key 16, 18 on the phone keypad or deliver a voice command to place the phone call. The user may then conduct business over the phone, including purchasing or ordering the product or service, inquiring as to location, driving directions, or hours of operation of the business, or may ask questions concerning the advertisement or the product or service, to list just a few examples. Other communications options such as text messaging, paging, and the like may also be incorporated with the click-to-call advertising format 36.

A third format 38, labeled "Ad Format C," may be a coupon format, and may permit a user to view, acquire, receive, redeem, email, etc., a coupon for associated goods and/or services. The coupon may provide for a discounted price on the goods or services, may permit the user to purchase goods/services that might not otherwise be available to the user, or may enable the user to take advantage of some other special or limited-time offer. Rebates redeemable for refunds or coupons entitling the user to complimentary products or services may also be provided under this format.

The coupon may be redeemable in a number of manners. For example, the coupon format 38 may include a coupon code that the user could present to a merchandiser after printing the code or otherwise transferring the code to a tangible medium (e.g., jotting the code down on paper). Alternatively, the coupon code or equivalent may be electronically transferred to the merchandiser, and the user's account may be credited in an appropriate amount. Follow-up email, text- or voice message confirmation may also be provided. Use of such coupons may also entitle the user to additional benefits, such as admission into drawings or contests where prizes are awarded, or acknowledgement as a preferred or distinguished customer with attendant perks, such as free shipping, free gift wrapping, free or discounted customer service support, extended warranty eligibility, etc.

A fourth format 40, labeled "Ad Format D," may be a banner format that may provide information concerning the advertisement, and may include, for example, textual content and/or one or more images that may be representative of the respective products and/or services. In one implementation, an ad presented in a banner format 40 does not include an associated action. In other implementations, one or more actions are associated with the banner format 40. Banner format ads may be text-only or image-only ads, or may include combinations of text and one or more images. Embedded content may also be included. The exemplary collection of ad formats 34, 36, 38, 40 described above is meant to be illustrative, and other format types can additionally or optionally be used. Examples include video clip ad formats, including animation-based formats, and audio clip ad formats, as well as combination audio/video formats.

In some cases, a given advertisement may have more than one associated ad format of a particular type. For example, an advertisement may include two or more click-through-to-landing-page formats, each of which may correspond to a landing page having text in a particular language (e.g., English, Japanese, French, Spanish, German, etc.). Similarly, an advertisement may include more than one click-to-call format, where the formats are associated with different phone numbers, for example, or where one is associated with a phone call action and one with a text message action, etc. Multiple coupon formats or banner formats may also be available for a given advertisement, and any suitable combination of the various format types may be provided. The ad service control module 33 may then dynamically select an appropriate ad format for presentation on the device 12 according to various rules, conditions, inputs, etc., as will be more fully described below.

In addition, a promotional message can also be represented by multiple styles of ads, whether in the same or different formats. For example, a maker of pens may want to target young professionals, students, and older professionals for the same product.

Different styles of ads can be prepared to target users in each sub-market. For example, small video clips may be prepared, with one showing the pen's useful homework features (e.g., a combination ballpoint and highlighter), edgy business features (e.g., a built-in MP3 player), and traditional business features (e.g., classic design). While each of these ads may be in the same format (video clip), they may each have different styles. In addition, the formats could vary (e.g., with a click-through ad for younger people and a dial-through ad for older people). The ad service control module 33 may then dynamically select an appropriate ad style and/or format for presentation.

Each of the ad formats 34, 36, 38, 40 may include one or more components 42 for different tags or indicators (e.g., HTML tags, or XHTML, cHTML, or WML format components) that are included within the document. For clarity, FIG. 1 only shows the components 42 for the fourth ad format 40. The components 42 may be used to determine how to display electronic content within the document, including text, graphics, audio, video, embedded content, etc., according to one implementation. Certain document components may include address link information or phone number information. For example, certain HTML tags may provide information about URL (Uniform Resource Locator) links to other documents stored on separate servers.

In addition, a document template may be provided to include all of the components that are common to the various document formats. Each document format may then define additional components to be added to the template. For example, the template could include a logo, while each format could define content (e.g., a text-based message targeted to a certain demographic) to go with the template.

The control station 24 may be a work station, computer terminal, mobile computer, PDA or other handheld device, etc., and may permit an administrator or user to update or modify advertisement service parameters, rules, mappings or algorithms stored in the data processing system 20. For example, an administrator may decide that all grocery ads should be presented in a coupon format, all car ads should be presented in a click-to-call format, or that all computer-related ads should be presented in a click-through-to-landing-page format, to list just a few illustrative examples. The administrator may implement one or more mappings specifying that each advertisement of a particular type (e.g., pertaining to groceries, cars, or computers) be presented in a particular format (e.g., coupon, click-to-call, click-through-to-landing-page, etc.). These modifications may be made in response to actual or predicted trends in user content preferences or selections, for example, or may be in made in response to evaluative data such as surveys or market studies. The changes or modifications may then alter future operation of the ad service control module 33 and the manner in which promotional content is dynamically selected and presented, permitting a flexible method of updating system parameters or algorithms.

Figure 2:
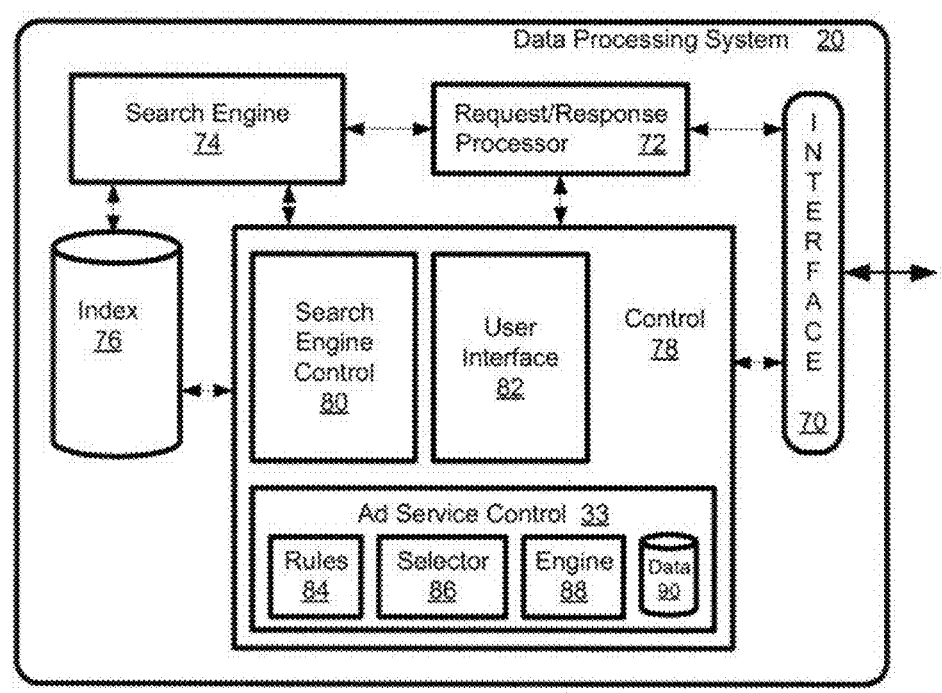
FIG. 2 is a block diagram of the data processing system of FIG. 1.

The data processing system 20 may take any appropriate form, and may be, for example, a system such as that provided by Google or other similar companies, such as those providing on-line search services. FIG. 2 is a block diagram of the data processing system 20 of FIG. 1. The data processing system 20 may receive information requests from the mobile device 12 (see FIG. 1), may locate suitable information corresponding to the request, may dynamically select an appropriate format from among a collection of possible formats for the information, may prepare the information in the selected format for presentation on the display 14 of the device 12, and may convey the content to the device 12. The data processing system 20 includes an interface 70 to permit external communications in a variety of ways. For example, the data processing system 20 may use the interface 70 to communicate with the servers 22a-22c (see FIG. 1) over the network 26 to access and process electronic content that is stored on the servers 22a-22c. Similarly, the data processing system 20 may communicate with the mobile devices 12a-12c via the network 26, or via the network 26 and the cellular phone network, for example, or via some other combination of networks. A request/response processor 72 may receive and process, as by parsing or formatting, for example, a request from the mobile device 12a, such as a network search request. The network search request may include one or more search query terms entered by a user.

A search engine 74 may then receive the search request from the request/response processor 72, and may search a searchable index 76 for electronic content appropriate for, or corresponding to, the search request. The ad service control module 33 may additionally influence the search, as by providing relevant parameters, instructions, or directives to the search engine 74. The index 76 may include an index database and a cached information database. The index database may contain data representing searchable information available to the data processing system 20. As an illustrative example, the data processing system 20 may scan the Internet or various intranets for content such as web sites, workgroup discussions, advertisements, etc. The system 20 may extract key words, phrases, or other objects from the content, and may organize the information in the index database in a manner that allows ready searching. Statistical or other information such as indicators of how certain web sites link to other web sites to facilitate a system such as the Google Page Rank system may also be generated.

The cached database may contain copies or partial copies of content that the data processing system 20 has identified. In one implementation, the cached database may contain web pages or portions of web pages (e.g., only textual content or only non-video content) or advertisements or portions of advertisements. The cached database may permit a user accessing the system 20 to request locally-stored copies of the content rather than remote copies, which may otherwise require making direct contact with the content provider. As such, the user may be able to reduce latencies and access content faster, and may have access to content that the provider has since altered or removed, or to content that has otherwise become unavailable from the content provider. Additional information including various applications, system parameters, information about registered users of the system 20, etc., may be stored in storage (not shown in FIG. 2) within the data processing system 20.

A control component 78 manages the operation of the data processing system 20, and includes a search engine and content control module 80, a user interface control module 82, and the ad service control module 33, in this implementation. The search engine and content control module 80 may include a crawler that automatically traverses the network 26 and requests electronic documents or advertisements from the servers 22 (see FIG. 1). Such content, or portions thereof (e.g., keywords), may then be stored in the index database or cached database, and may later be searched or retrieved.

The content may be classified according to the electronic format the content is provided in, by whether the content is of a type that may be presented on a mobile device (for example, whether on a particular device or on mobile devices in general), by the genre of product or service an advertisement pertains to, by advertiser or goods/service provider, etc., or by any other appropriate classification strategy. The search engine and content control module 80 may use predetermined or modifiable conditions or methods to determine whether the content is to be stored in the index 76, and whether information currently stored in the index 76 should be purged, including first-in-first-out (FIFO), least recently used (LRU), random replacement, or other appropriate methods known to those skilled in the art.

The user interface control module 82 prepares electronic content for presentation on the display 14 of the mobile device 12a, and receives user input. The user interface control module 82 may work in concert with the request/response processor 72 to format a response to a request in a manner that allows it to be used by the requesting device, such as device 12a. For example, the request/response processor 72 may format or convert information to a Wireless Application Protocol (WAP) format, HTML document, XML document, VoiceML result, dHTML, xHTML, Java, Javascript, or any other format that the requesting device may be capable of interpreting, and may then convey the result to interface 70 to be transmitted to device 12 over network 26 (see FIG. 1). Internal communications within the data processing system 20 may occur over a high speed, high bandwidth network or networks such as SONET, Infiniband, Ethernet, or any other appropriate architecture and protocol to permit the system 20 to respond to a large number of distinct requests simultaneously, or near simultaneously.

As described above, in this implementation, the ad service control module 33 resides in the control component 78. In other implementations, the ad service control module 33 may stand alone in the data processing system 20, or may reside on the mobile device 12 (see FIG. 1).

The ad service control module 33 may include, for example, ad service rules 84, an advertisement or ad service selector 86, an ad service engine 88, and data storage 90. Any of the ad service rules 84, selector 86, engine 86, or data storage 90 may be combined or separated as appropriate, and may be centrally located (as in data processing system 20) or locally installed (as on the mobile device 12). In some implementations, one or more of the ad service rules 84, selector 86, engine 88, or data storage 90 may be omitted.

The ad service rules 84 may include parameters, statistics, algorithms, profiles or mappings that may be applied so as to manage the manner in which advertisements and ad formats are analyzed and selected for presentation. The ad service rules 84 may be specific to particular users (e.g., in a profile of rules for the user, or with pointers for a user to particular parameters so as to minimize required storage space). For example, the ad service rules 84 for a particular user may indicate that the user prefers click-to-call ad formats, or click-through-to-landing-page ad formats, or another preferred format. The rules may also indicate that the person prefers a particular style of ad (e.g., humorous and edgy, or informative and serious) or is part of a demographic from which preferences may be reasonably inferred.

Such indications may be specified by the user, for example, or may be dynamically determined by the ad service control module 33 by cataloging and analyzing user responses, noting trends or behavior patterns in user responses, etc., and adjusting accordingly. For example, if the ad service control module 33 notes that the user has a higher "selection rate" (that is, the ratio of the number of times that the ad is "selected" to the number of times the ad is rendered or the number of ad impressions) for click-to-call ads versus other types of ad formats, the module 33 may dynamically increase the percentage of advertisements presented in this preferred format. As such, the user may be served ads in a format to which she is more receptive, which may result in a more enjoyable user experience and may result in a more effective advertising campaign for the advertiser.

The rules 84 may also include expected bandwidth information, resolution capabilities, processor qualifications, or other device or network limitations for a particular user or mobile device, which may influence the types of ad formats that are most appropriate for that user or mobile device. The ad service rules 84 may additionally or alternatively include rules pertaining to all mobile device users, or to particular subsets of mobile device users.

The ad service rules 84 may be dynamically updated by the ad service control module 33 in response to user inputs or selections (either from a particular user or from a collection of users), including aggregating responses over a period of time and analyzing the inputs for trends. Moreover, the rules 84 may be dynamically updated by the ad service control module 33 in response to changing conditions or circumstances such as an unavailability of network or phone service in a particular area or associated with a particular server, business, or communications device, for example. In an implementation, the ad service control module 33 may log and monitor how a particular user or group of users responds to various content presentations, such as selection rates for various advertisements or advertisement formats, and may modify the rules 84 in response.

The ad service selector 86 controls which selection mode, of possible options, is used by the ad service control module 33 to analyze and dynamically select among advertisement formats. Many selection modes, or methods of dynamically determining an appropriate advertising format, may be used. In one implementation, a received user query, such as a network search query, is classified into a query category, and ad format selection and presentation is determined according to the category. In other implementations, the information received from the communication device may include a description of the content that a user is presently viewing, or has previously viewed, a description of a user's bookmarks, surfing history, or a list of preferred or often-visited web sites, a prior indication of a user's interests, or a location, such as a GPS location or cell location, for example. Promotional content may be then targeted based on this information. Individual user or device input histories, or aggregations of inputs from multiple users or devices over a period of time may be used, including responsive behavior according to previous format presentation.

Mappings from category to ad format may be manually updated, as by an administrator using control station 24, or may be automatically updated by the ad service control module 33. As another example, content from individual advertisements may be parsed to determine an appropriate ad format. Word strings within the ad may be parsed, for example, and may be compared with predetermined keywords so that an appropriate format may be determined based on the comparison.

As yet another example, each advertising format for a given advertisement may be assigned a monetization value based upon an amount that the corresponding advertiser is willing to pay per rendition or per selection of the particular ad format. Monetization values may be defined according to a CPC (cost per click), or CPM (cost per 1000 renditions) approach, or another pricing method as appropriate. Some advertisements or advertisement formats may be offered under a homogeneous pricing structure, while others may be offered under a mixture of structures (e.g., both CPC and CPM). In one embodiment, an advertisement includes one or more CPC ad formats, and one or more CPM ad formats. In an effort to maximize realized revenue, the ad service control module 33 may use the monetization values, in conjunction with ad selection histories or expected outcomes for particular query types, e.g., to strategically select and serve suitable advertisement formats dynamically. Cross-ad format auctions could be used to establish monetization values, permitting businesses to bid for monetization values. Additionally, multiple ad formats or styles could be syndicated, which may increase the monetization potential of the ads. In one implementation, a syndication partner may select a subset of the available ad formats or styles. Random ad format presentation may also be used. This may preserve spontaneity, and may be implemented with a random number generator as is known to those skilled in the art.

In an implementation, the ad service control module 33 may dynamically serve ads according to a conversion rate analysis. Conversion rates may be defined in a number of ways, and may vary depending on advertising category or advertising format. One type of conversion rate may be the ratio of the number of times a user consummates a purchase (or performs other similar activities such as reviewing information presented by the advertiser) after viewing an advertisement versus the number of times the advertisement is rendered to, or impressed upon, the user. For example, a user may be served a click-to-call format ad; the user may select the ad to place a call to the business and may purchase merchandise over the phone, resulting in a conversion. As another example, the user may be served a click-through-to-landing-page ad, and may select the ad; the ad service control module 33 may present the landing page of the corresponding business to the user, who may then purchase an item from the site within a predetermined time (e.g., one hour, one day, or one week), resulting in another conversion. A user redeeming a coupon obtained via presentation of a coupon format advertisement may be yet another example of a possible conversion. Alternatively, a conversion may be defined by any appropriate measurable or observable user action, such as spending a sufficient amount of time viewing a landing page or web site, selecting one or more links to other documents within the landing page or web site (or navigating to at least a given depth), registering on a web page, conversing for a predetermined amount of time or with a sufficient level of interest or specificity over the phone, etc.

When using selection rate or conversion rate analysis for dynamically serving promotional content to mobile devices, the ad service control module 33 may use any suitable statistical measure or technique to determine whether modifications, substitutions, or adaptations of selection and/or serving strategies are warranted. For example, thresholds, linear combinations with appropriate weighting coefficients, standard or moving (such as one-week, two-week, one-month, two-month, six-month, etc.) averages, or any other appropriate statistical technique may be used.

Selection modes may be adjusted according to a predetermined schedule. In one implementation, a particular selection mode (such as one of those discussed above) is alternated with a random selection mode according to a predetermined time or ad-count schedule. For example, the ad service control module 33 may dynamically select ad formats according to a conversion rate selection mode for a predetermined period of time (e.g., one day), and then switch to a random selection mode for another predetermined time (e.g., twelve hours, one day, two days, etc.), and continue to alternate between the modes in this fashion. Alternatively, the module 33 may alternate between modes following the service of a predetermined number of ads. More complex selection mode schemes, including involving more than two modes, may also be used.

The ad service engine 88 applies processes to the ad service rules 84 according to a setting indicated by the ad service selector 86. The ad service engine 88 thereby causes appropriate advertisements and advertisement formats to be provided, for example, so that components within the data processing system 20 may prepare them for presentation on the mobile device 12.

The data storage 90 is a repository for storing information useful to the selection and presentation of promotional content, such as user selection histories and preferences, compilations of multiple user histories, device specification information, including device limitations that would caution against service of a particular ad format, survey data, advertiser or content provider information, etc. To allow for scalability, the data processing system 20 or any of its components may be split into two or more separate systems or components, and may be connected to the network 26 or to one another in any of a variety of ways, as is known in the art. In addition, the various components may be located at the same location or different locations, and may be controlled by one or multiple entities.

FIGS. 3-10 are exemplary screen shots showing promotional content in various advertising formats that may be presented on a mobile device. The data processing system 20 may present each of the screen shots shown in FIGS. 3-10 on the display 14 of the mobile device 12 (see FIG. 1). The promotional content shown in FIGS. 3-10 relates to camping, backpacking, and outdoor adventure, and may correspond, for example, to advertisement 28 and various of its associated ad formats (see FIG. 1).

Figure 3:
FIGS. 3-10 are exemplary screen shots showing promotional content in various advertising formats that may be presented on a mobile device.

FIG. 3 is an advertisement presented in a text-only format that may include one or more of the following: a title 120 that provides an identifying label for the advertisement (labeled "Bargain Camping Supplies" here), a text section 122 that may include one or more lines of text that provide additional description for the advertisement, and a World Wide Web (WWW) address 124. The address 124 may denote the address of the business's home page, for example, or may list the physical address of the place of business. Because the text ad of FIG. 3 does not include images, icons, video, or other bandwidth-intensive content, it may be appropriate for situations where bandwidth concerns or device limitations make presentation of more complicated formats difficult.

Figure 4:
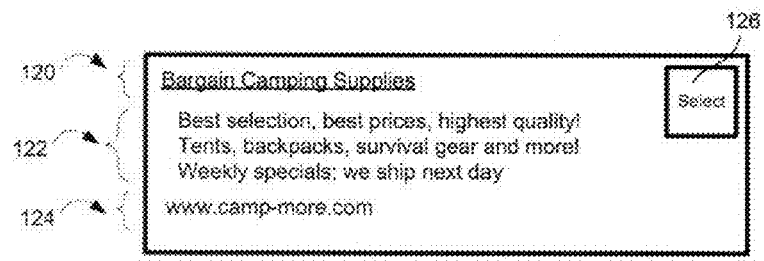

FIG. 4 is an advertisement presented in a click-through-to-landing-page format that includes the same title 120, text section 122, and address 124 as the text ad of FIG. 3, and additionally includes a selectable indicator 126 (labeled "Select"), that when selected by a user causes the data processing system 20 to present related electronic content, such as a web page, on the display 14 of the mobile device 12. In one implementation, a user may press a button on the phone keypad to select the indicator 126, perhaps after first navigating to focus on the indicator (that is, taking actions to cause the indicator to be highlighted or otherwise distinguished to denote that the indicator will be selected following an appropriate action, like a button push). When the indicator 126 is selected, the data processing system 20 may load the landing page or home page of the corresponding business—a camping supply store in this example—or alternatively may load a Web page associated with a particular product or service, to list just a couple illustrative examples. This electronic content may be loaded from an external server 22a-22c (see FIG. 1), from the index 76 of the data processing system 20 (see FIG. 2), or from memory within the mobile device 12. In the latter example, the content may have been previously downloaded to the mobile device 12, such as at the time that the advertisement was transferred to the device. Similarly, the promotional content shown in FIGS. 3-10 may be loaded from any of an external server 22, the data processing system 20, or local memory on the device 12. In one implementation, multiple formats are downloaded to the device 12, and selection and presentation is performed later.

Figure 5:
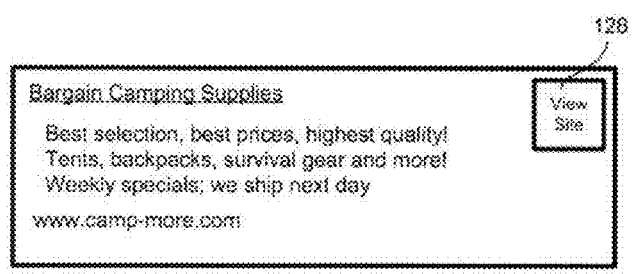

FIG. 5 is an advertisement presented in another click-through-to-landing-site format with a selectable indicator 128 labeled "View Site," which informs a user that they can view an associated web site by selecting the indicator. For any of the formats, the content may be called up by methods other than clicking on a particular icon. For example, the entire area of the advertisement may be "live," so that clicking anywhere on it produces a click-through. In addition, different areas of the ad may be provided to perform different actions. As one example, a single ad could display a subset of all available formats, such as click-to-call and a click-through-to-landing site. Such options could be provided in two different areas of an ad, or in the form of a question to the user after the user has selected a general click-through selection. As another example, multiple click-through-to-landing site options may be available in a single ad, such as by directing a user to various product sites where the ad pictures multiple different products.

Figure 6:
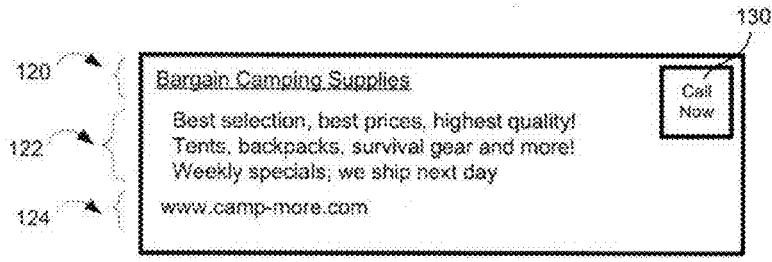

FIG. 6 is an advertisement presented in a click-to-call format that includes the same title 120, text section 122, and address 124 as the text ad of FIG. 3, and additionally includes a selectable indicator 130 (labeled "Call Now"), that when selected by a user causes a telephone call to be placed to the corresponding business. For example, the user may be intrigued by the promotional content of the click-to-call ad, and may wish to call the business to get information on products or services, pricing, availability, hours of operation, driving directions, address or location, business policies, etc. The click-to-call format may provide a convenient method of facilitating direct contact between a potential customer and a representative of the business itself, which may provide prompt answers for the user and a ripe sales opportunity for the business. The text may also differ, as discussed above, such as by describing various aspects of camping supplies that could pertain to various demographic groups, such as sales specials, adventure gear, and natural preservation.

Click-to-call ad formats may be appropriate for advertisements from businesses local to a home calling area for a mobile device. Moreover, click-to-call formats may be appropriate when a user is traveling and happens to be in the same geographic area as the advertising business. The ad service control module 33 may determine an appropriate advertising format from among the various possibilities for a particular advertisement, and may serve and present the most appropriate format on the device 12a. Also, parameters associated with such ads may provide additional information about whether the click-to-call is relevant to a particular region (e.g., for local service businesses) or is broader, e.g., nationwide, so that the user is not shown a click-to-call option if they are not in an appropriate region (e.g., as determined by GPS readings provided by their device).

Figure 7:
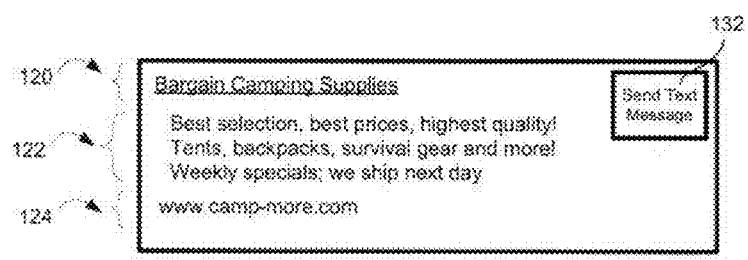

FIG. 7 is an advertisement presented in a click-to-call format that includes a selectable indicator 132 that, when selected, permits a user to send a text message to the business associated with the advertisement. For example, the user may select the indicator 132 and key-in a text message in the conventional way, and the message may be sent to the business. A representative of the business might later return the text message or call the user.

Figure 8:
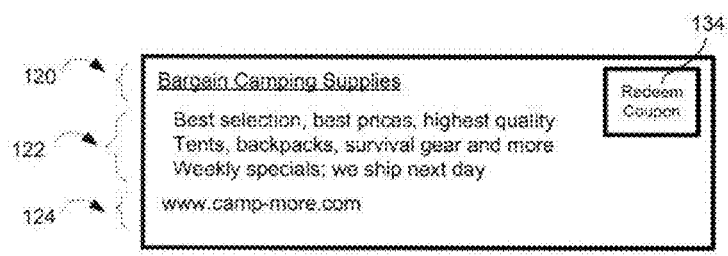

FIG. 8 is an advertisement presented in a coupon format that includes the same title 120, text section 122, and address 124 as the text ad of FIG. 3, and additionally includes a selectable indicator 134 (labeled "Redeem Coupon"), that when selected by a user may cause a coupon-related event to occur. For example, upon selection of the indicator 134, the data processing system 20 may present a coupon code on the display 14 of the mobile device 12a. The user may then print or write down the coupon or coupon code, and may later redeem the coupon for a discounted price on an associated good or service. Alternatively, after a user selection of the indicator 134, the data processing system 20 may e-mail the coupon code to a suitable recipient account, such as that of the user or the corresponding business.

The user may then be able to redeem the coupon, or an account may be automatically credited in an amount associated with the coupon. Because many consumers enjoy receiving discounts on their purchases, promotional content presented in a coupon format may develop and fortify brand loyalty among consumers, which may result in improved sales and profits for the corresponding businesses or advertisers.

Figure 9:
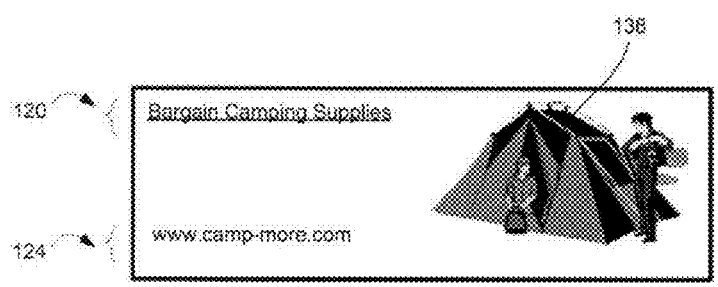

FIG. 9 is an advertisement presented in a banner format that includes the title 120 and address 124 of the previously discussed ads, and includes an image 136, in this case depicting two people enjoying a camping experience. The banner format may also include one or more text sections, and may include additional images. In one implementation, banner format advertisements do not include an associated action or related content (such as an associated web page, phone number, coupon, etc.). A user might view the banner ad, note the electronic address 124 of the business ("www.camp-more.com"), and decide to access the site at a more convenient future time, for example. In other implementations, advertisements presented in banner formats may have related content or actions associated with them.

Figure 10:
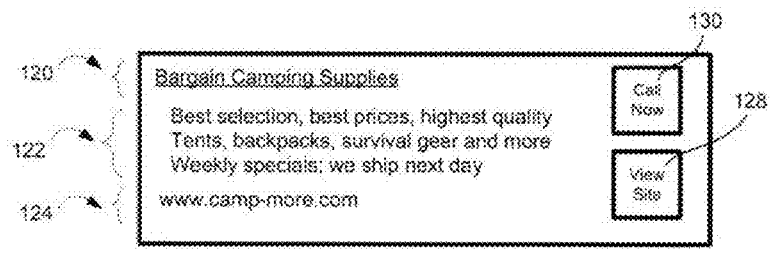

FIG. 10 is an advertisement presented in a combination click-to-call, click-through-to-landing-site format, and includes two associated actions. The ad includes the click-to-call indicator 130 and the click-through-to-landing-site indicator 128 from FIGS. 6 and 5, respectively. The indicators 128, 130 may function as previously described, and may provide a user with two convenient options for pursuing the advertisement. Other combinations, such as an advertisement including click-to-call and coupon functionality, or click-through-to-landing-page and coupon functionality, etc., may also be used. Format combinations involving three or more formats are also possible.

Figure 11:
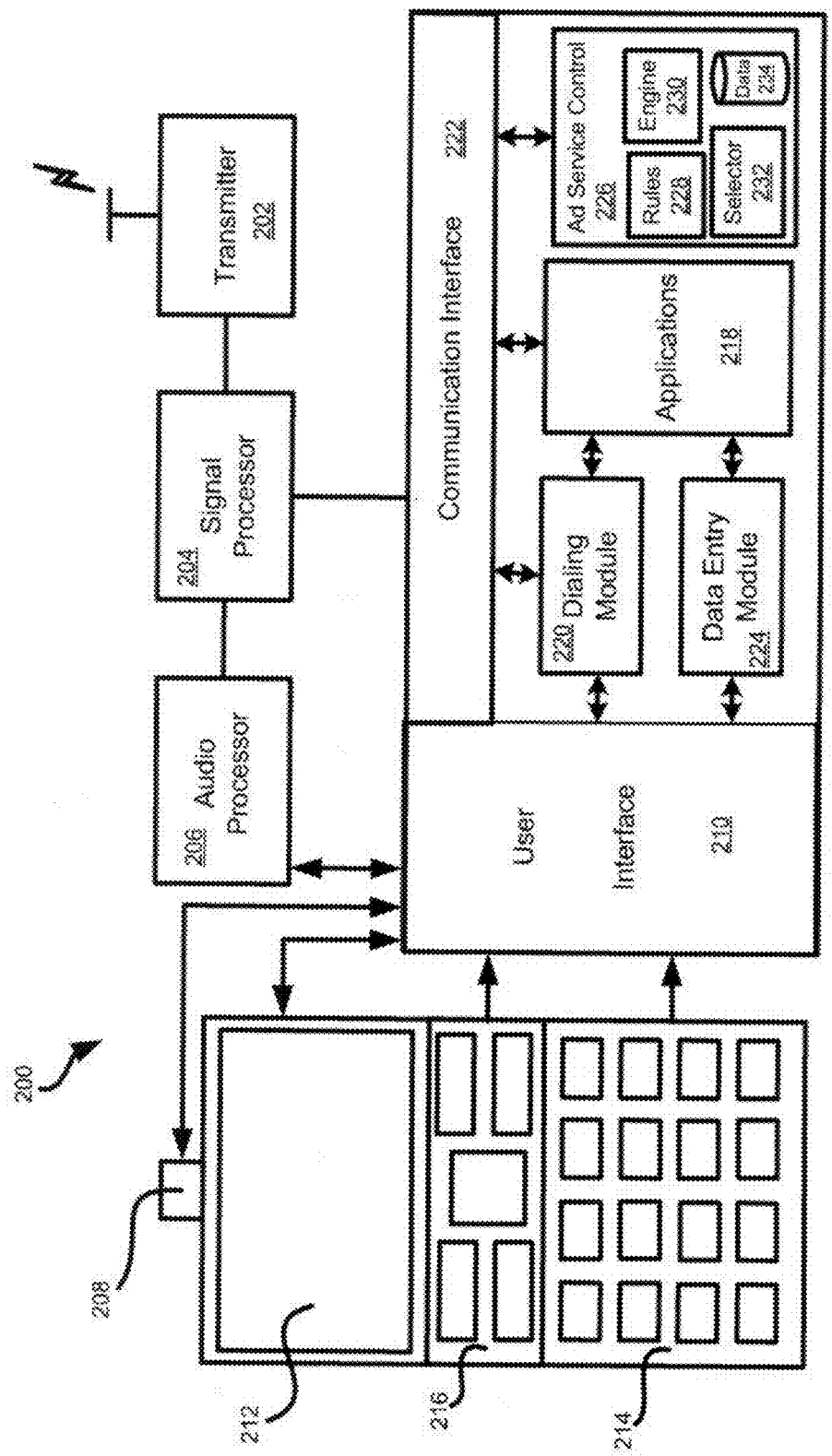
FIG. 11 is a schematic diagram of a wireless communication handset for generating requests and receiving and using information generated in response to those requests.

FIG. 11 is a schematic diagram of a wireless communication handset for generating requests and receiving and using information generated in response to those requests. A communication system 200 may be implemented in a device such as a personal communicator, e.g., a cellular telephone. The system 200 receives and transmits information wirelessly using a transmitter 202, with the received signals being passed to a signal processor 204, which may comprise digital signal processor (DSP) circuitry and the like. Normal voice communication is routed to or from an audio processor 206, which may communicate with a speaker/microphone 208, including via a user interface 210.

User interface 210 handles all communication with the user of the system 200, including voice, visual, and data entry communication. Visual presentation of information may be provided via a display screen 212. General data entry, apart from entered voice data, may occur through a keypad 214, which may be arranged as a standard 12-key telephone keypad. The device may also be provided with appropriate control keys 216 for performing necessary control functions. Keypad 214 and control keys 216 may include contact push-buttons, joysticks, portions of touch-sensitive panels, or other appropriate input devices. Although the communication is shown for clarity as occurring through a single user interface 210, multiple interfaces may be used, and may be combined with other components as necessary.

The system 200 may be provided with a number of computer applications 218, such as games, applications to assist in dialing numbers, and applications to permit web browsing, including the entry of data as part of the web browsing. The applications 218 may be stored in ROM, Flash memory, RAM, MRAM, EPROM, EEPROM, or otherwise, as appropriate, and may be accessed by the system 200 as needed. A dialing module 220 may provide standard dialing functionality for the system, receiving entered dialing digits or voice dialing instructions through interface 210, and providing appropriate dialing signals through transmitter 202 using a communication interface 222. A data entry module 224 receives data other than dialing instructions, such as search data entered into the system 200. The data entry module 224 may provide the entered data to an application 218, for example.

In one implementation, the user interface 210 functions at a low level of abstraction to control or respond to the I/O devices of the system 200 as directed by the user interface module 82 of the data processing system 20 (see FIG. 2). Examples include input receipt and display presentation. The user interface 210 may receive user input, such as an input signal resulting from a user pressing keypad 214 or keys 216, and may convert the input in a manner known to those skilled in the art to an appropriate signal that may be interpreted by the user interface module 82. The user interface 210 may also receive signals from the user interface module 82 that specify a particular view to be rendered on the screen 212, and may generate appropriate signals to effectuate the desired display view in a manner known to those skilled in the art. In another embodiment, the user interface 210 may assume a larger role and work in concert with the user interface module 82, sharing user interface administration and control duties with the user interface module 82. In yet another embodiment, the user interface module 82 may be merged with the user interface 210 on the handset.

An ad service controller 226 may include service rules 228, a service engine 230, a service selector 232, and storage 234. These components 228, 230, 232, 234 may work in a similar manner to those discussed with respect to data processing system 20 in FIG. 2. The ad service controller 226 may also be included as part of an application 218. In general, the components allow all or part of the process of dynamic analysis, selection, service and presentation of advertisements to be taken up by the system 200 itself rather than by a central system.

Although shown in an implementation in a personal communicator, system 200 may take many other forms. For example, system 200 could be implemented as part of a personal computer, whether networked or un-networked, and if networked, whether by wire or wirelessly. Also, data entry may occur in different manners, including by complete keyboard, constrained keyboard, or voice command. Also, one or more components may be located remotely from the system 200, such as at a remote server, and the functionality of system 200 may be provided by combining the components or using components other than those shown.

Also, a server may initially pre-load various advertisements onto system 200, and those advertisements may later be displayed as the user uses the system 200. Such as system may avoid latency problems in displaying advertising, and may actually display the advertising during latency periods in downloading content. For example, if a user at one point searches for "mp3 players," the system may be sent promotional content from manufacturers such as Apple, Samsung, and LGE, and from service providers such as Sony, Arista, and Def Jam. That promotional content may not be displayed initially (e.g., if it is downloaded in the background).

Figure 12:
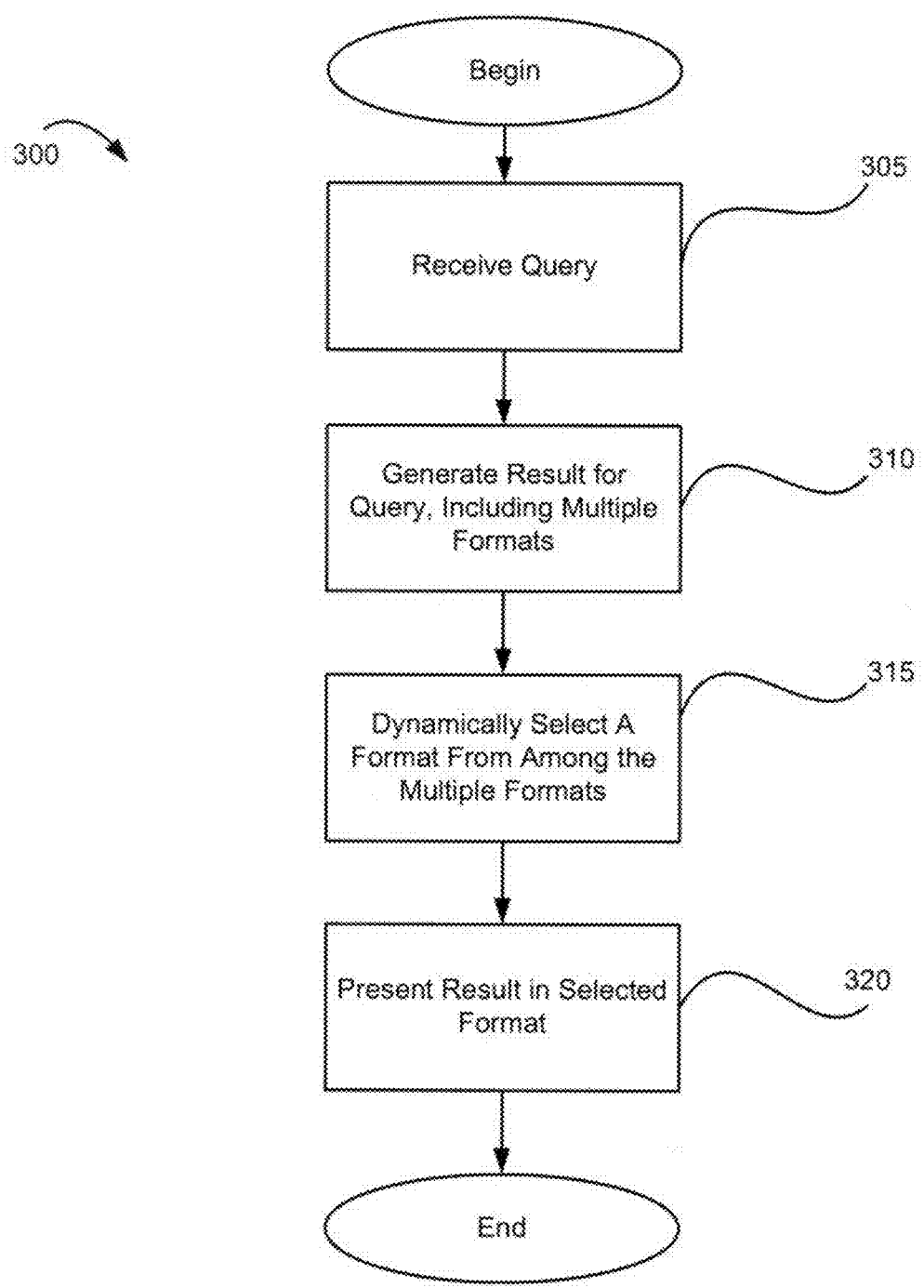
FIG. 12 is a flow chart showing exemplary steps for providing dynamic service of advertisements for a mobile device.

FIG. 12 is a flow chart 300 showing exemplary steps for providing dynamic service of advertisements for a mobile device. The steps shown may be generally executed by the ad service control module 33, which may reside on a central server, such as data processing system 20, or on a mobile device. A process begins at step 305 with a receipt of a query from a mobile device. The query may include one or more search terms, as previously described. In response to the query, a result may be generated at step 310, and the result may include one or more possible formats. In one implementation, the result is an advertisement that has multiple associated ad formats, one or more of which may be presented on a mobile device. An appropriate format may be dynamically selected from among the possible formats at step 315, and the selected format may be served to the mobile device at step 320, and the process ends.

Figure 13:
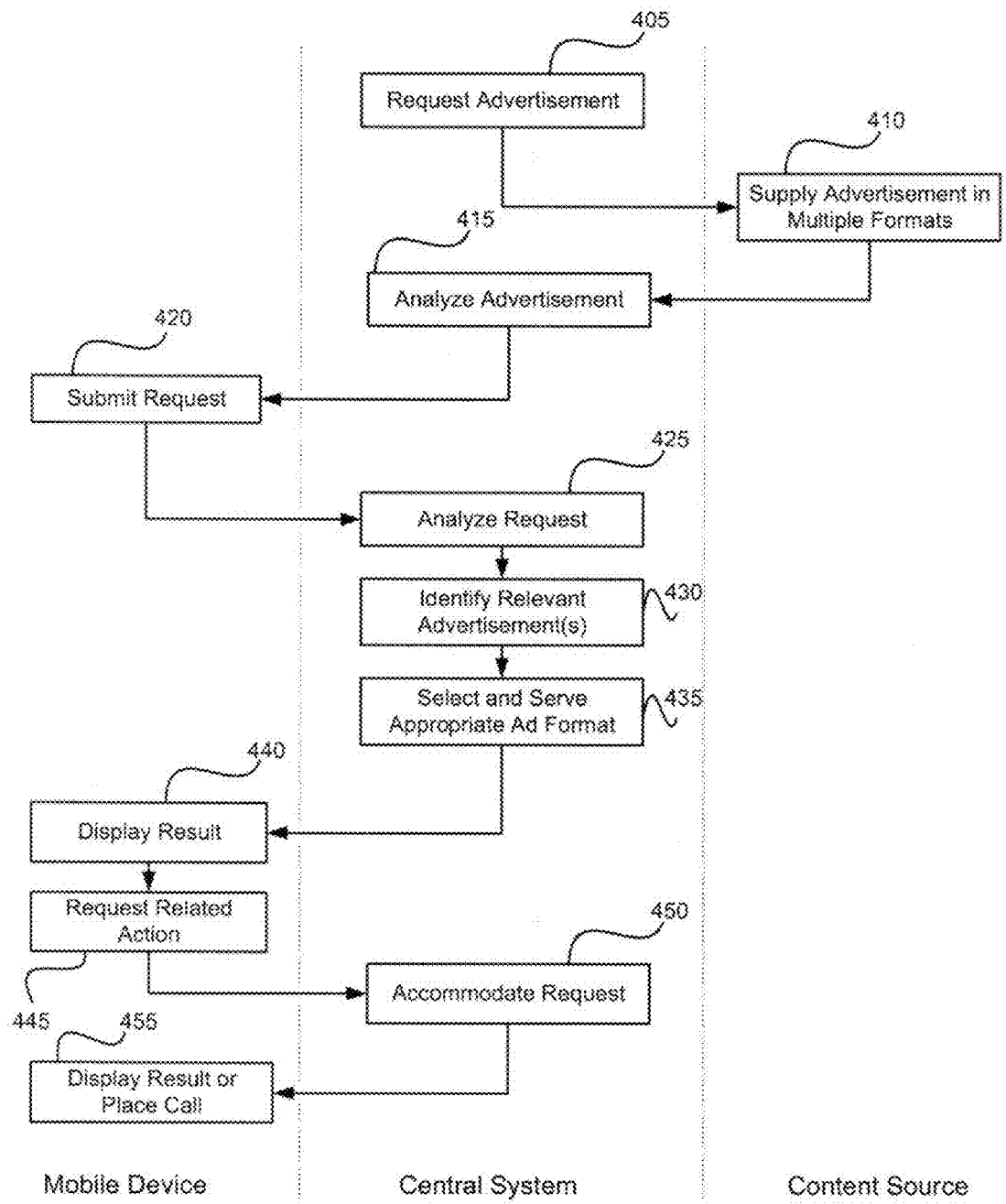
FIG. 13 is a mobile device-central system-content source flow chart showing exemplary steps for providing dynamic service of advertisements for a mobile device.

FIG. 13 is a mobile device-central system-content source flow chart showing exemplary steps for providing dynamic service of advertisements for a mobile device. In general, the chart shows a process by which promotional content is obtained and dynamically analyzed, selected and served from among multiple possible formats and presented to a mobile device. The flow chart generally depicts steps that can be performed in parallel as an example of the operation of the process, but the operations could occur in other orders and with other steps as appropriate. The chart is divided into three regions: a left region labeled "Mobile Device," a center region labeled "Central System," and a right region labeled "Content Source." In general, the regions indicate that steps located therein are performed by a mobile device (such as device 12a), a central system (such as data processing system 20), or a content source (such as server 22), respectively.

At step 405, the central system requests an advertisement, and a content source supplies an advertisement in one or more formats at step 410. The central system may analyze the advertisement and the associated formats at step 415, including parsing and classification of words, word strings, images, embedded content, etc. The central system may store the advertisement and related key words in an index for later searching, for example, and may append additional information as appropriate. A mobile device may submit a request to the central system at step 420, such as a network search request. The central system may analyze the request at step 425, including parsing the query and classification of the query into a query category. Relevant advertisements may be identified at step 430, as by employing a search engine to search an index according to supplied parameters. The advertisements may then be analyzed and characterized. When a given advertisement is identified, an appropriate ad format may be selected at step 435 from among one or more potential ad formats associated with the advertisement using mappings and rules, algorithms, selector modes, etc. In some implementations, the search engine may only identify advertisements associated with a particular format. The advertisement in the selected format may then be served to the mobile device.

At step 440, the mobile device may display the advertisement in the selected format. The advertisement may include an associated action and related content, and at step 445 the user may request the related action or content. For example, with a click-through-to-landing page format the user may select the ad to view a related web page, and with a click-to-call format the user may select the ad to place a call to the corresponding business. A coupon ad format may allow the user to receive or redeem a coupon, as previously described. The central system may accommodate the request at step 450, including presenting the related content (web page, coupon or coupon code, etc.), facilitating a phone call or text message, and the like. The mobile device may display the result of the action, such as the related web page or coupon, if applicable, at step 455, or may place a phone call or send a text message as appropriate.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here may be realized in digital or analog electronic circuitry, integrated circuitry, specially designed ASICs (application specific integrated circuits) or FPGAs (field programmable gate arrays), computer hardware, firmware, software, and/or combinations thereof. These various implementations can include implementation in one or more computer programs that are executable and/or interpretable on a programmable system including one or more programmable processors, which may be special or general purpose, coupled to receive data and instructions from, and to transmit data and instructions to, a storage system, at least one input device, and at least one output device.

These computer programs (also knows as programs, software, software applications, applications, or code) include machine instructions for a programmable processor, and can be implemented in a high-level procedural and/or object-oriented programming language, and/or in assembly language or machine language. As used herein, "machine-readable medium" refers to any computer program product, apparatus and/or device (e.g., magnetic disc, optical disc, memory, Programmable Logic Device (PLD)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

The computing system can include clients and servers. A client and server are generally remote from each other and typically interact through a communication network. The relationship of client and server arises by virtue of computer programs running on the respective computers and having a client-server relationship to each other. The client-server relationship need not fit a formal client-server definition, however.

A number of embodiments of the invention have been described. Nevertheless, it will be understood that various modifications may be made without departing from the spirit and scope of the invention. Portions of this disclosure discuss operation though portable devices, but any of a number of devices may be used, including fully-functional general purpose computers. Also, the logic flows depicted in the figures do not require the particular order shown, or sequential order, to achieve desirable results. Also, other steps may be provided, or steps may be eliminated, from the described flows, and other components may be added to, or removed from, the described systems.

Various kinds of I/O devices may be used, including a CRT (cathode ray tube) or an LCD (liquid crystal display) display screens or monitors, keyboards and pointing devices (mouse, trackball), to list just a few examples. Also, other kinds of feedback can be provided (e.g., visual feedback, auditory feedback, or tactile feedback), and input from the user can be received in any form, including acoustic, speech, or tactile input.

In some implementations, portions of the dynamic service of advertisements may be performed on a central server while other portions may be performed locally on the mobile device. For example, a central server may aggregate a group of advertisements or a group of ad formats for one or more advertisements, perhaps in response to a query from the mobile device, and may download the content to memory on the local device. Then, following storage of the content, selection of the appropriate advertisement or ad format may be performed locally at the mobile device. Accordingly, other embodiments are within the scope of the following claims.

What is claimed is:

1. A method performed by a data processing apparatus, the method comprising:
   identifying a result to provide to a communication device, the result including unformatted advertising content provided by an advertiser for presentation to a user of the communication device;
   identifying a plurality of stored presentation formats that are eligible for use in presenting the result, wherein each stored presentation format specifies:
      a different manner for displaying the advertising content than each other presentation format,
      an action that is performed in response to user interaction with a result presented using the respective presentation format, the action specified in each respective presentation format different from the action specified in each other presentation format, and
      one or more document component areas;
   retrieving a predetermined presentation percentage for each of the plurality of stored presentation formats presented to the user;
   identifying a predetermined character string within the unformatted advertising content;
   mapping a classification of the predetermined character string to a particular presentation format of the plurality of stored presentation formats;
   increasing the presentation percentage associated with the particular presentation format of the plurality of stored presentation formats based on user preference data that indicates a preference of the user for the particular presentation format;
   selecting, from the plurality of stored presentation formats, the particular presentation format to use for presenting the result based on the mapping of the classification of the character string to the particular presentation format, the information relating to the communication device, and the increased percentage associated with the particular presentation format based on the user preference data that indicates the preference of the user for the particular presentation format;
   preparing the result for presentation by the communication device by adding the advertising content of the result to the one or more document component areas of the particular presentation format; and
   providing the prepared result for presentation in the particular presentation format for display by the communication device, the communication device executing the action corresponding to the particular presentation format in response to user interaction with the prepared result.

2. The method of claim 1, wherein:
the result is identified based on a query received from the communication device; and
the particular presentation format is selected based further on a category to which the query is assigned.

3. The method of claim 1, wherein the preference of the user for the particular presentation format is based on one or more responses by the user to results presented using the particular presentation format.

4. The method of claim 1, wherein the information relating to the communication device comprises at least one of display resolution capabilities of the communication device, processor qualifications of the communication device, or bandwidth information.

5. The method of claim 1, wherein the plurality of stored presentation formats include at least one of a click-to-call format, a click-through-to-landing page format, a coupon format, a video clip format, an audio clip format, or a banner format.

6. The method of claim 1, wherein the particular presentation format is selected based further on a location of the communication device.

7. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
identifying a result to provide to a communication device, the result including unformatted advertising content provided by an advertiser for presentation to a user of the communication device;
identifying a plurality of stored presentation formats that are eligible for use in presenting the result, wherein each stored presentation format specifies:
a different manner for displaying the advertising content than each other presentation format,
an action that is performed in response to user interaction with a result presented using the respective presentation format, the action specified in each respective presentation format different from the action specified in each other presentation format, and
one or more document component areas;
retrieving a predetermined presentation percentage for each of the plurality of stored presentation formats presented to the user;
identifying a predetermined character string within the unformatted advertising content;
mapping a classification of the predetermined character string to a particular presentation format of the plurality of stored presentation formats;
increasing the presentation percentage associated with the particular presentation format of the plurality of stored presentation formats based on user preference data that indicates a preference of the user for the particular presentation format;
selecting, from the plurality of stored presentation formats, the particular presentation format to use for presenting the result based on the mapping of the classification of the character string to the particular presentation format, the information relating to the communication device, and the increased percentage associated with the particular presentation format based on the user preference data that indicates the preference of the user for the particular presentation format;
preparing the result for presentation by the communication device by adding the advertising content of the result to the one or more document component areas of the particular presentation format; and
providing the prepared result for presentation in the particular presentation format for display by the communication device, the communication device executing the action corresponding to the particular presentation format in response to user interaction with the prepared result.

8. The system of claim 7, wherein:
the result is identified based on a query received from the communication device; and
the particular presentation format is selected based further on a category to which the query is assigned.

9. The system of claim 7, wherein the preference of the user for the particular presentation format is based on one or more responses by the user to results presented using the particular presentation format.

10. The system of claim 7, wherein the information relating to the communication device comprises at least one of display resolution capabilities of the communication device, processor qualifications of the communication device, or bandwidth information.

11. The system of claim 7, wherein the plurality of stored presentation formats include at least one of a click-to-call format, a click-through-to-landing page format, a coupon format, a video clip format, an audio clip format, or a banner format.

12. The system of claim 7, wherein the particular presentation format is selected based further on a location of the communication device.

13. A non-transitory computer storage medium encoded with a computer program, the program comprising instructions that when executed by a data processing apparatus cause the data processing apparatus to perform operations comprising:
identifying a result to provide to a communication device, the result including unformatted advertising content provided by an advertiser for presentation to a user of the communication device;
identifying a plurality of stored presentation formats that are eligible for use in presenting the result, wherein each stored presentation format specifies:
a different manner for displaying the advertising content than each other presentation format,
an action that is performed in response to user interaction with a result presented using the respective presentation format, the action specified in each respective presentation format different from the action specified in each other presentation format, and
one or more document component areas;
retrieving a predetermined presentation percentage for each of the plurality of stored presentation formats presented to the user;
identifying a predetermined character string within the unformatted advertising content;
mapping a classification of the predetermined character string to a particular presentation format of the plurality of stored presentation formats;
increasing the presentation percentage associated with the particular presentation format of the plurality of stored presentation formats based on user preference data that indicates a preference of the user for the particular presentation format;

selecting, from the plurality of stored presentation formats, the particular presentation format to use for presenting the result based on the mapping of the classification of the character string to the particular presentation format, the information relating to the communication device, and the increased percentage associated with the particular presentation format based on the user preference data that indicates the preference of the user for the particular presentation format;

preparing the result for presentation by the communication device by adding the advertising content of the result to the one or more document component areas of the particular presentation format; and providing the prepared result for presentation in the particular presentation format for display by the communication device, the communication device executing the action corresponding to the particular presentation format in response to user interaction with the prepared result.

14. The non-transitory computer storage medium of claim 13, wherein:

the result is identified based on a query received from the communication device; and the particular presentation format is selected based further on a category to which the query is assigned.

15. The non-transitory computer storage medium of claim 13, wherein the preference of the user for the particular presentation format is based on one or more responses by the user to results presented using the particular presentation format.

16. The non-transitory computer storage medium of claim 13, wherein the information relating to the communication device comprises at least one of display resolution capabilities of the communication device, processor qualifications of the communication device, or bandwidth information.

17. The non-transitory computer storage medium of claim 13, wherein the plurality of stored presentation formats include at least one of a click-to-call format, a click-through-to-landing page format, a coupon format, a video clip format, an audio clip format, or a banner format.

18. The non-transitory computer storage medium of claim 13, wherein particular presentation format is selected based further on a location of the communication device.

* * * * *